United States Patent [19]
Hill et al.

[11] Patent Number: 6,085,200
[45] Date of Patent: Jul. 4, 2000

[54] SYSTEM AND METHOD FOR ARRANGING DATABASE RESTORATION DATA FOR EFFICIENT DATA RECOVERY IN TRANSACTION PROCESSING SYSTEMS

[75] Inventors: Michael James Hill, Vadnais Heights; Thomas Pearson Cooper, New Brighton; Dennis Richard Konrad, Welch; Thomas L. Nowatzki, Shoreview, all of Minn.

[73] Assignee: Unisys Corporation, Blue Bell, Pa.

[21] Appl. No.: 08/997,115

[22] Filed: Dec. 23, 1997

[51] Int. Cl.[7] ................................................ G06F 17/30
[52] U.S. Cl. ................................................ 707/202; 714/2
[58] Field of Search ........................ 707/8, 203, 200–202; 714/1, 2, 13, 15, 21, 22

[56] References Cited

U.S. PATENT DOCUMENTS

| 5,193,162 | 3/1993 | Bordsen et al. | 707/1 |
|---|---|---|---|
| 5,307,481 | 4/1994 | Shimazaki et al. | 714/11 |
| 5,333,314 | 7/1994 | Masai et al. | 707/202 |
| 5,717,919 | 2/1998 | Kodavalla et al. | 707/8 |

OTHER PUBLICATIONS

Byers, L.L. et al., U.S. Patent Application, Attorney Docket No. RA–3264, filed Dec. 23, 1993, entitled "Extended Processing Complex for File Caching".

Cooper, T.P. et al., U.S. Patent Application, Attorney Docket No. RA–3247, filed Dec. 23, 1993, entitled "Outboard File Cache System".

*Primary Examiner*—Hosain T. Alam
*Attorney, Agent, or Firm*—Charles A. Johnson; Mark T. Starr; Altera Law Group

[57] ABSTRACT

A system and method for assembling database restoration data according to transaction in a transaction processing system. Database restoration data is collated by chronologically storing updated database records in distinct storage banks partitioned according to its corresponding transaction. Resulting database record blocks from storage banks associated with completed database transactions are queued in the order that their corresponding transactions were completed. The queued database record blocks are transferred to storage media, whereby the queued database record blocks are arranged on the storage media according to transaction, and in the order that the active transactions were completed.

30 Claims, 12 Drawing Sheets

SYSTEM AND METHOD FOR ARRANGING DATABASE RESTORATION DATA FOR EFFICIENT DATA RECOVERY IN TRANSACTION PROCESSING SYSTEMS

FIELD OF THE INVENTION

This invention relates generally to database recovery of transaction processing systems, and more particularly to a system and method for chronologically assembling and storing database restoration data on a per-transaction basis, thereby increasing speed and efficiency of database recovery in the event of a storage media failure.

BACKGROUND OF THE INVENTION

Many computing systems today utilize multiple processing units, resulting in a computer architecture generally referred to as multi-processing. Multi-processing systems are often used for transaction processing, such as airline and banking systems. Transaction processing refers generally to a technique for organizing multi-user, high volume, on-line applications that provides control over user access and updates of databases. A transaction refers to the execution of a retrieval or an update program in a database management system. Transactions originating from different users may be aimed at the same database records.

It is important that system hardware or software failures do not result in a loss of database records. The system should be recoverable, which refers to the consistency, integrity and restoration characteristics of an application's database and message environment. A system is recoverable if the process of making permanent all requested database changes and messages is completed even if a host failure occurs during the process of "committing", which refers to the process of making database changes permanent. The system must also maintain indivisibility, which means that all of each transaction's requested database changes and messages must be made permanent as a unit only if the transaction completes successfully; otherwise all must be nullified. This characteristic ensures that the overall database contents are consistent and that the transaction's messages reflect the results of such database contents.

Prior art transaction processing systems provide for recoverability by providing separate permanent data storage devices for each functional module in the system. In order to recover from a system failure, transaction information from each of the functional modules is stored on an external audit trail, which is a sequential storage media for storing a duplicate of the database updates in real-time, or substantially in real-time. If a software, hardware, or other system failure occurs during the execution of certain transactions, valid database updates stored on the audit trail can be copied from the audit trail back onto the database to restore the database to a known valid state.

Prior art systems store valid database updates to the audit trail in the order in which the corresponding updated data records become available, regardless of which transaction the database record is associated with. This piecemeal approach results in an audit trail having portions of various transactions scattered throughout the audit trail storage media. If recovery via the audit trail becomes necessary, each data record or other status information corresponding to a failed transaction must be located on the audit trail storage media prior to restoring the complete transaction to the database. This requires the recovery system to search the storage media, such as a tape or disk, to find the first transaction record, the transaction completion record, and all database records therebetween, which involves a great deal of time and complex searching overhead. In multi-tasking and/or multi-processing transaction processing systems, there may be several hundred or more transactions being concurrently processed. This makes recovery even more time-consuming and complex, as portions of the many transactions will be scattered throughout the audit trail storage media.

The present invention overcomes many of the problems associated with such a sequentially-ordered recovery system, and provides database restoration information to the audit trail in a manner which can be effectively and efficiently used by a database recovery system to restore the database. The present invention therefore provides a solution to the aforementioned and other shortcomings of the prior art, and offers numerous advantages over the prior art.

SUMMARY OF THE INVENTION

The present invention relates to a system and method for assembling database restoration data according to transaction during transaction execution in a transaction processing system, and for storing the resulting transaction restoration blocks in the order in which the transactions are completed, thereby increasing speed and efficiency of database recovery in the event of a failure of the primary storage media.

In accordance with one embodiment of the invention, a method is provided for collating database recovery information in a transaction processing system capable of concurrently executing multiple transactions. The database recovery information includes previously valid database records which can be used to restore the transaction processing system database to its previously valid condition upon recognition of transaction errors. The database records, generated by active transactions, are chronologically stored in storage banks partitioned according to transaction. The resulting database record blocks from the storage banks associated with completed database transactions are queued in the order that their corresponding active transactions were completed. The queued database record blocks are transferred to a storage media, whereby the queued database record blocks are arranged on the storage media according to transaction in the order that the active transactions were completed.

In accordance with another embodiment of the invention, a method for collating database recovery information on an external storage media on a per-transaction basis is provided for use in a transaction processing system having at least one host processor and a database. The recovery information includes previously valid database records which are used to restore the database to a previously valid condition upon recognition of transaction errors. Execution of database transactions are requested from user terminals to one or more host processors in the transaction processing system. A transaction memory structure is created for each of the database transactions. Each of the transaction memory structures include a transaction identifier and a pointer to a unique storage bank designated for each of the database transactions. Database records resulting from each of the database transactions are chronologically stored in their respective storage banks. The database records from the storage banks associated with completed database transactions are queued in the order that the database transactions were completed. The queued database records are transferred to the external storage media, whereby the queued database records are grouped according to transaction in the order that the database transactions were completed.

In accordance with another aspect of the invention, a memory architecture for allowing transaction recovery information to be arranged according to transaction is provided. The transaction recovery information includes previously valid database information used to restore the database to a valid state upon the occurrence of a transaction failure. Multiple storage modules are provided, where each of the storage modules stores the transaction recovery information associated with a distinct transaction. Multiple memory structures are also provided, where each memory structure also corresponds to a distinct transaction, in order to isolate accessibility of the transaction recovery information associated with the distinct transaction to the corresponding memory structure. Each memory structure includes a control information field to store a transaction identifier that identifies the distinct transaction to which it corresponds, and further includes at least one information address field to store a pointer to the storage module that stores the transaction recovery information associated with the transaction identifier. Storage media is provided to consecutively store the contents of the storage modules corresponding to completed transactions.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
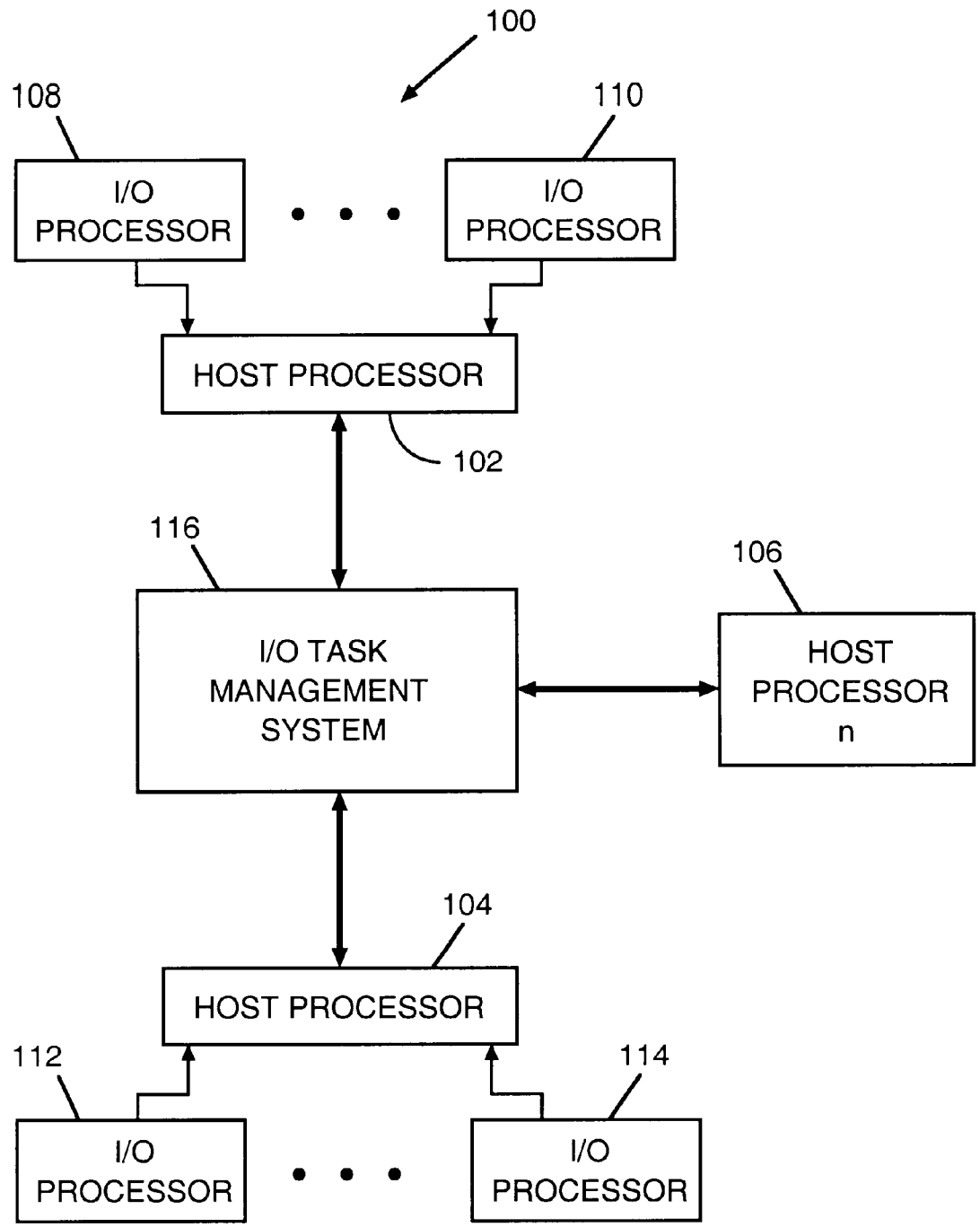
FIG. 1 is a is a block diagram of one embodiment of a multiprocessing computing system providing I/O task management in accordance with the present invention.

FIG. 1 is a block diagram of one embodiment of a multiprocessing computing system 100 providing I/O task management in accordance with the present invention. Multiprocessing generally refers to the operation of more than one processing unit within a single system, simultaneous program execution, or both. Multiple host processors may operate in parallel to enhance speed and efficiency. Separate processors may also take over communications or peripheral control, for example, while the main processor continues program execution. A host processor generally refers to the primary or controlling computer in a multiple computer network. In the multiprocessing computing system 100 of FIG. 1, each of a plurality of multiple host processors 102, 104 through host processor n 106 are coupled together to create a robust multiprocessing system. Each of the host processors typically includes memory, and may actually be comprised of multiple instruction processors (IPs) to create an aggregate host processing function.

In order to more efficiently control input and output functions, each of the host processors is interfaced to input/output (I/O) processors, which perform functions necessary to control I/O operations. The I/O processors relieve host processors from having to execute most I/O-related tasks, thereby allowing host processing functions to be expedited. In FIG. 1, any number of I/O processors may be coupled to a particular host processor. For example, host processor 102 is coupled to n processors, illustrated by I/O processors 108 to 110. Similarly, host processor 104 is shown coupled to a plurality of I/O processors 112, 114, and host processor n 106 is depicted as a stand-alone processor having no interfaced I/O processors.

Multiprocessing systems are used for various computing functions, including large database applications. A database generally refers to the large, shared, mass-memory data collections, and the technology to support efficient retrieval and reliable update of persistent data. Database management systems operable within the multiprocessing system comprises a collection of programs which interface with application programs and manage data on the application programs' behalf. The database management system provides data independence and integrity, and allows the database to maintain consistent data and data integrity.

It is also very important that the system provide transaction "indivisibility", wherein each transaction's requested database updates must be made permanent as a unit only if the transaction completes successfully. Where the transaction completes successfully, it is referred to herein as "committing" the data, meaning the transaction update will become permanent in the database. The systems which manipulate the databases are not infallible, and in the event that a failure occurs, the message processing system must guarantee that transaction messages are not lost, and that the messages are not processed twice. In these cases, the transaction is nullified, which ensures the overall database contents are always consistent, and that the transaction's messages reflect the results of such database content.

In order to provide database and message recovery against future host or database media failure, transaction processing includes an "audit trail" capability to externally record database changes and message processing activity. The audit trail contents reflect the "indivisible" valid states for the transaction processing environment as a result of each transaction program. The present invention provides for efficient management and distribution of the real-time audit data which is ultimately forwarded to an audit trail storage media to store information used in recovering the valid state of the database in the event that a transaction, component, or other system error occurs during transaction processing.

Figure 2:
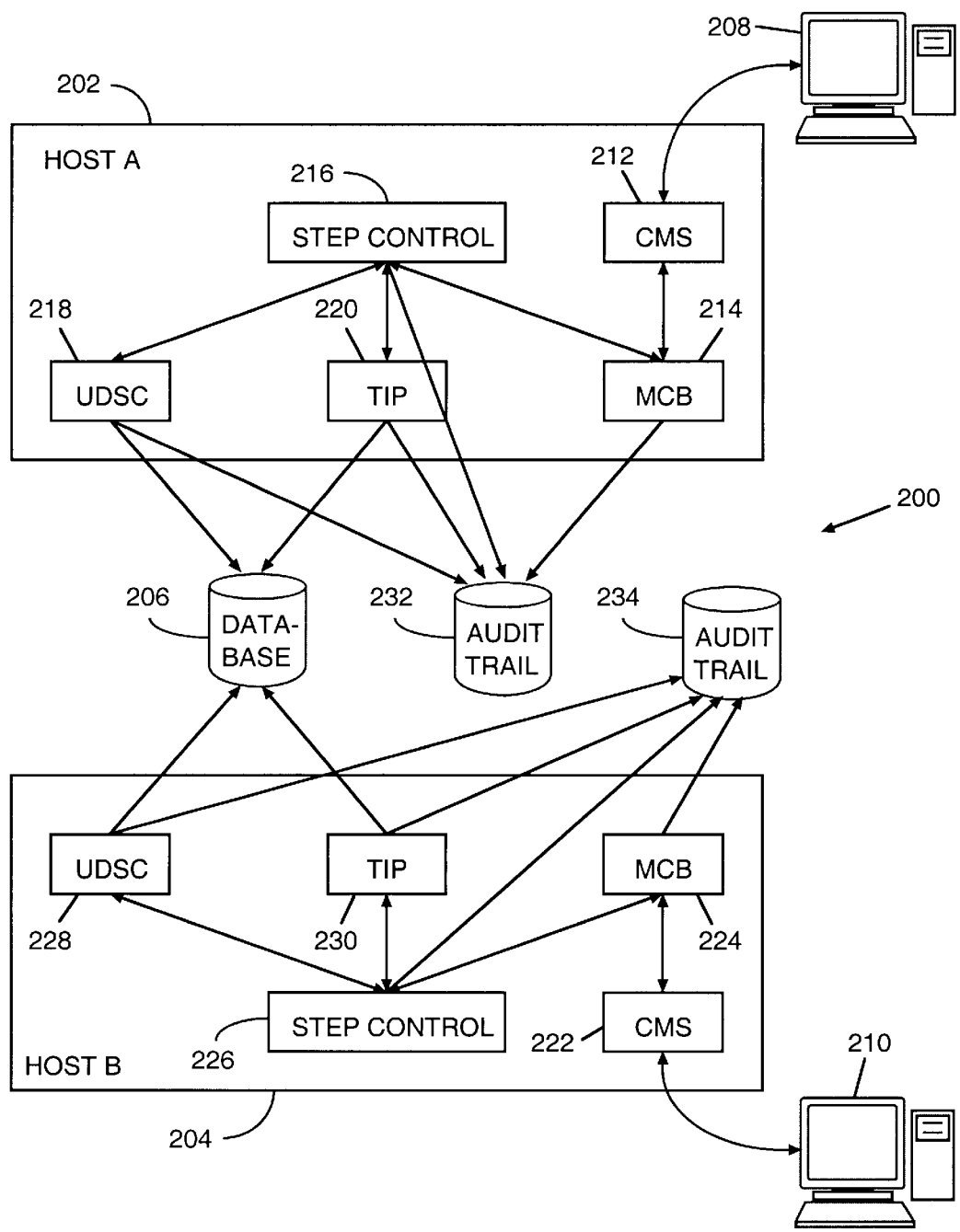
FIG. 2 is a block diagram illustrating a prior art multiprocessing system.

FIG. 2 is a block diagram illustrating a prior art multi-processing system. The multi-processing system of FIG. 2 includes host A 202 and host B 204. Each host 202, 204 is coupled to a common database 206. Each host 202, 204 is also coupled to a user terminal, depicted by computing devices 208, 210, respectively.

When a user initiates a database transaction on a user terminal, such as computing device 208, the transaction request is sent in the form of a message from the terminal to the Communications Management System (CMS) communication program 212. The CMS program 212 provides handshaking protocols between the host and the terminal. The CMS module 212 forwards the message to the Message Control Bank (MCB) 214, which is a software module that manages all transaction-related messages received by the host from the terminal (source messages), or sent by a transaction to a terminal (destination messages). In turn, the MCB 214 notifies the step control module 216 that a message was received. The step control 216 is a software module that coordinates the activities of all components participating in a database transaction, including the MCB 214, the Universal Data System Control (UDSC) management system 218, and the Transaction Interface Processing (TIP) management system 220.

The UDSC 218 and the TIP 220 are database management systems which provide services to ensure the integrity of the database. For example, the UDSC 218 and the TIP 220 ensure that either all updates associated with the transaction are applied to the database, or none of the updates are applied to the database, in the event that a failure occurs during a transaction. Single database management systems could be used rather than the bifurcated database management system comprising the UDSC 218 and the TIP 220, but in the system of FIG. 2, the UDSC 218 is a relational database management system which provides a large searching capability, and the TIP 220 database management system is a "flat" or "linear" management system that provides fewer search capabilities, but faster database accesses in many circumstances. Therefore, depending on the nature of the user requests, one or possibly both of the database management systems will participate in a database transaction.

The host B 204 also includes software modules including the CMS 222, the MCB 224, step control 226, a UDSC 228, and the TIP 230. These software modules work analogously to the software modules in other hosts of the multi-processing system, such as host A 202.

During transaction processing, the UDSC 218 and/or TIP 220 database management systems generally retain a copy of the existing data whenever the transaction requests a database update. If the transaction proceeds to a stable point where it can be "committed," all new updated data is secured to the database by the UDSC 218 and/or TIP 220 database management systems. If the transaction does not proceed to a stable point because a transaction, host processor, or component/module failure occurs before this committed state can be achieved, none of the updates are applied, but rather are "rolled back" so that the current copy of the data is maintained. This is accomplished using retention files during the database update procedure, which is described more fully below. Audit data is also collected during each transaction update to temporarily store the proposed database update, which is ultimately provided to the audit trail if the database update completes successfully. In order to revert to the previous copy of data in the event of a storage media failure, the audit trail (which includes the audit data provided for each transaction) restores the database with the data stored within. The audit trail is used for each host in a multi-processing system, to save the previous state of the database at a location remote from each of the hosts. The audit trail information reflects the "indivisible" valid states for the application environment over a period of time. Therefore, the audit trail information can be used to recreate the latest valid copy of the database if that copy of the database were to be lost due to a storage media failure. As shown in FIG. 2, each host is associated with its own audit trail file, where host A 202 is associated with the host A audit trail 232, and host B 204 is associated with the host B audit trail 234.

In a multi-processing system including multiple host processors, one host can continue processing requests where another host has failed, without waiting for the failing host to recover. This can be accomplished as long as the database is put in a consistent state by the non-failing host. The non-failing host reads the failed host's audit trail data to determine which transactions have not yet been committed to the database, and to also locate those transactions which have only been partially committed and for which an "end-of-commit" record has not yet been written to the audit file. The updates associated with these uncommitted and partially committed transactions are then rolled back from the database by the non-failing host. After this rollback is completed, the non-failing host can continue processing requests against the database.

In prior art systems, performing a rollback using audit data requires a large amount of processing. This is due in part because information is stored in an audit trail file in the order in which it was provided by each of the host system components including TIP 220, UDSC 218, and MCB 214, and is not organized according to transaction. In other words, the audit data from each active transaction is accumulated piecemeal over the life of the transaction program, and is written directly to the external audit trail tape or disk in the order of occurrence. The non-failing host would have to sift through a large amount of audit data to determine which transactions have not been committed or which are only partially committed to the database. Furthermore, to provide I/O efficiency, synchronous audit requests were delayed so that audit data from many transactions in execution could be grouped into each audit block and written to the external audit trail as a single I/O transfer. Each transaction's audits therefore interfere with audits from other transactions. However, these delays which are introduced also result in inefficiencies.

Figure 3:
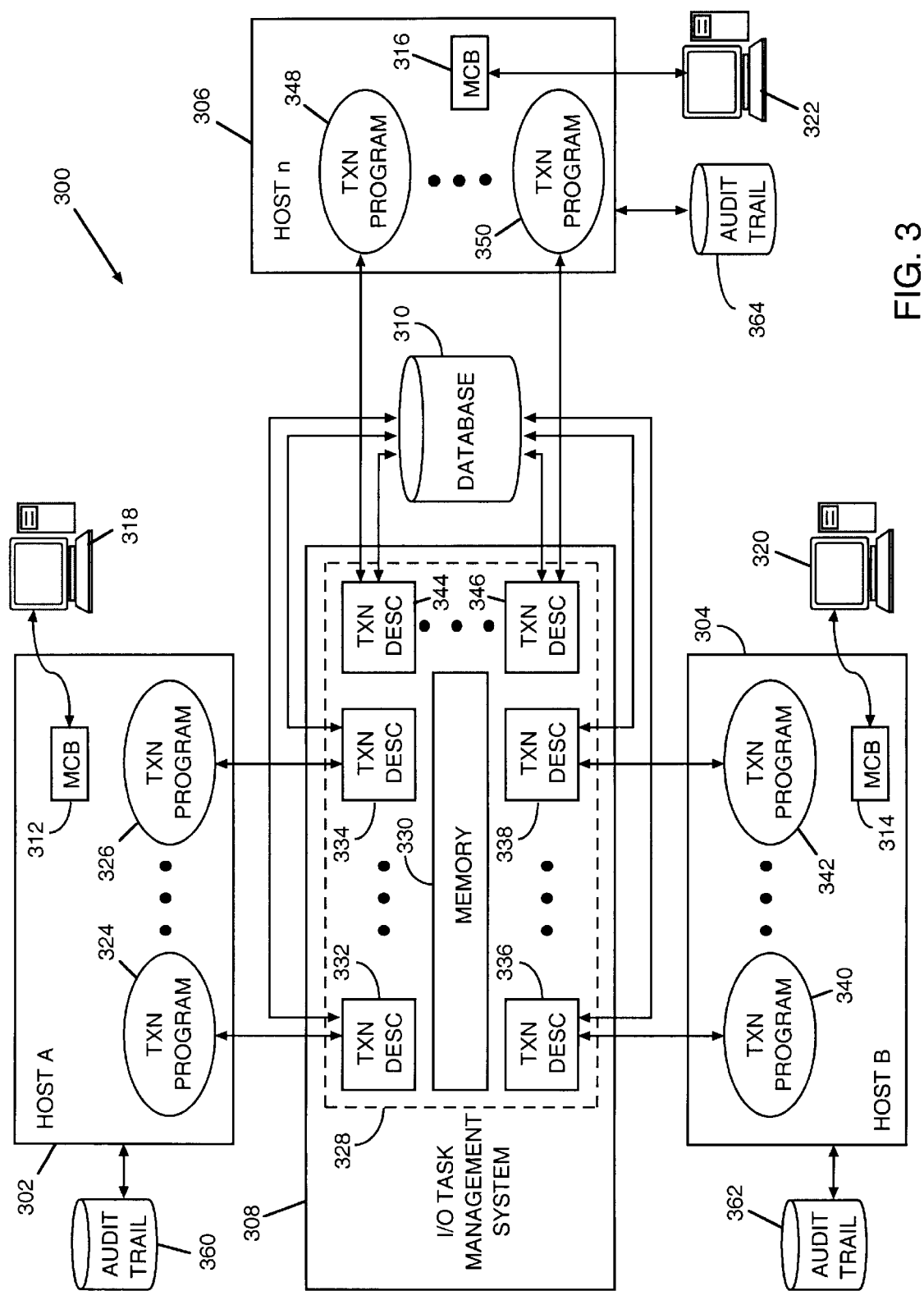
FIG. 3 is a block diagram illustrating the use of transaction data structures in a transaction processing system utilizing transaction auditing in accordance with the present invention.

FIG. 3 is a block diagram illustrating the use of transaction data structures in a transaction processing system 300 utilizing transaction auditing in accordance with the present invention. The present invention utilizes information stored in data structures, referred to as "transaction descriptors", to assist in performing audits. These transaction descriptors allow audits from one transaction to be independent of audits from other transactions. There is one transaction descriptor for each active transaction program in an application, where an "active" transaction program refers to a transaction program that is currently executing, and has not yet been terminated via a commit or rollback operation.

Referring to FIG. 3, a plurality of host processing units, labeled host A 302, host B 304, through host n 306, are coupled to a common input/output (I/O) task management system 308. Data transactions from any of the host processors 302, 304, 306 to the database 310 are accomplished via the I/O task management system 308. Each of the host processors 302, 304, 306 includes a Message Control Bank (MCB) 312, 314, 316, respectively, which in turn are coupled to one or more user interfaces depicted as computing devices 318, 320, 322, respectively. Each processor also includes storage control and database management components (not shown).

When a database transaction is initiated at a user terminal such as user terminal 318, the MCB 312 receives the transaction request and notifies a control module such as the step control module (not shown) that a message was received. Under the coordination of the step control module, one or more transaction programs, depicted at host A 302 as transaction program 324 through transaction program 326, provide an interface for the transaction request to the I/O task management system 308. The transaction programs represent any program capable of receiving a data transaction request and initiating a request to update or read information from the database 310. Examples of such transaction programs include banking system application programs and airline reservation programs. For example, an airline reservation program can receive database update requests from a user terminal 318, and can cause the database 310 to be updated accordingly. Each of the other host processors 304, 306 in the transaction processing system 300 also include one or more transaction programs.

The I/O task management system 308 of the present invention includes a non-volatile memory 328 which provides a centralized storage location for various files, versus the distributed external tape and disk file storage systems of the prior art. The non-volatile characteristics of the memory 328 provide the benefits of permanent external disk or tape storage, while also providing high-speed data storage and retrieval, and a centralized storage location which is accessible by each of the host processors in the transaction processing system 300.

Within the non-volatile memory 328 is a memory 330 which is used to store data structures necessary for successful recovery in the event that a catastrophic failure occurs in any of the host processors 302, 304 through 306. The data structures included in the file memory 330 will be described in further detail in connection with FIGS. 4 and 5 below.

The non-volatile memory 328 also includes several other data structures implemented from the non-volatile memory which are referred to as transaction descriptors. A transaction descriptor is provided for each of the transaction programs operating under the control of the host processors. For example, transaction descriptors 332 through 334 correspond to each of the transaction programs 324 through 326 of the host A processor 302. Similarly, transaction descriptors 336 through 338 correspond to transaction programs 340 through 342 of the host B processor 304, and the transaction descriptors 344 through 346 correspond to the transaction programs 348 through 350 of the nth host processor labeled host n. Each of the transaction descriptors in the I/O task management system 308 is accessible to every host processor in the transaction processing system 300. The transaction descriptors store control information and message data provided by the database management systems within each host processor on a per-transaction basis in one central location, instead of having separate, specialized data structures and files for each component. These transaction descriptors allow audit data to be distinguishable and separated on a per-transaction basis, which in turn organizes the data forwarding to audit trails 360, 362 through 364 to be conveniently organized on a per-transaction basis, thereby increasing speed and efficiency of recovery.

It should be noted that an audit trail may be used as the primary backup device to be used when the database storage media fails. Alternatively, the audit trail may be used as a secondary backup mechanism used in conjunction with a primary backup storage device. For example, a primary backup storage device may be configured to periodically (e.g., once a day, twice a day, etc.) store the state of the database. The audit trail information then collects all information since the last primary backup. In the event of a database storage failure, the primary backup device restores the database to a previous state corresponding to the time of the last periodic backup. The audit trail information is then used to restore the remaining portion of the database from the time of the last periodic backup. The present invention applies to audit trail storage whether used as a primary or secondary backup storage device.

Figure 4:
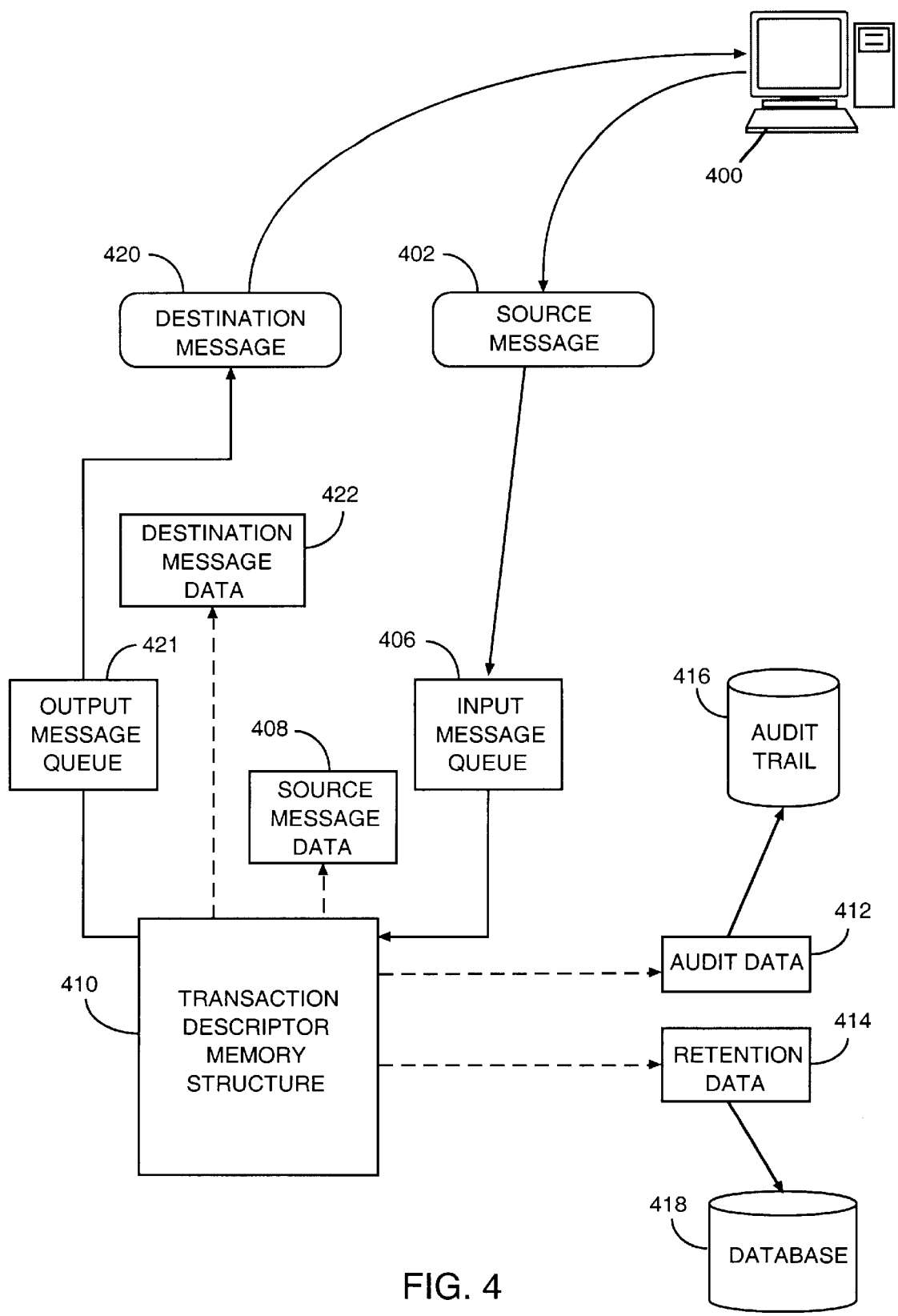
FIG. 4 illustrates a transaction flow from a user terminal which ultimately utilizes a transaction descriptor for updating and retrieving data from the common database.

FIG. 4 illustrates a transaction flow from a user terminal 400 which ultimately utilizes a transaction descriptor for updating and retrieving data from the common database. A transaction is initiated when the user terminal 400 issues a source message 402. The source message contains the message data as well as other information such as an identification of the transaction program that provided the message. The source message is received at the associated host processor, and forwarded to the I/O task management system where its corresponding data is stored in a non-volatile source message data structure 408, the location of which is identified by the source message stored in an input message queue 406. Step control schedules the transaction program subject to system resources, and when scheduled, a transaction descriptor memory structure 410 is allocated within the non-volatile memory. When the transaction descriptor memory structure 410 has been provided, the source message queued in the input message queue 406 is requeued in a predetermined location within the transaction descriptor 410, so that the transaction descriptor includes a pointer to the corresponding source message data in the source message data structure 408. The transaction descriptor memory structure 410 also stores pointers or links to the audit data 412 and the retention data 414 which ultimately may affect the data stored in the audit trail 416 and the database 418, respectively. When a transaction has been completed, a destination message 420 generated by the transaction program is returned to the user terminal 400 to acknowledge completion of the transaction or otherwise provide status. Any data associated with the destination message 420 is stored in the destination message data structure 422, and is identified by an address or pointer stored at a predefined location within the transaction descriptor memory structure 410. Upon committing the data, the destination messages are queued for subsequent transmission to the user terminal by moving the destination message pointer from the transaction descriptor memory structure 410 to the output message queue 421. As can be seen by the foregoing description, the transaction descriptor 410 provides a non-volatile, centralized memory structure which is structured on a per-transaction basis.

Figure 5:
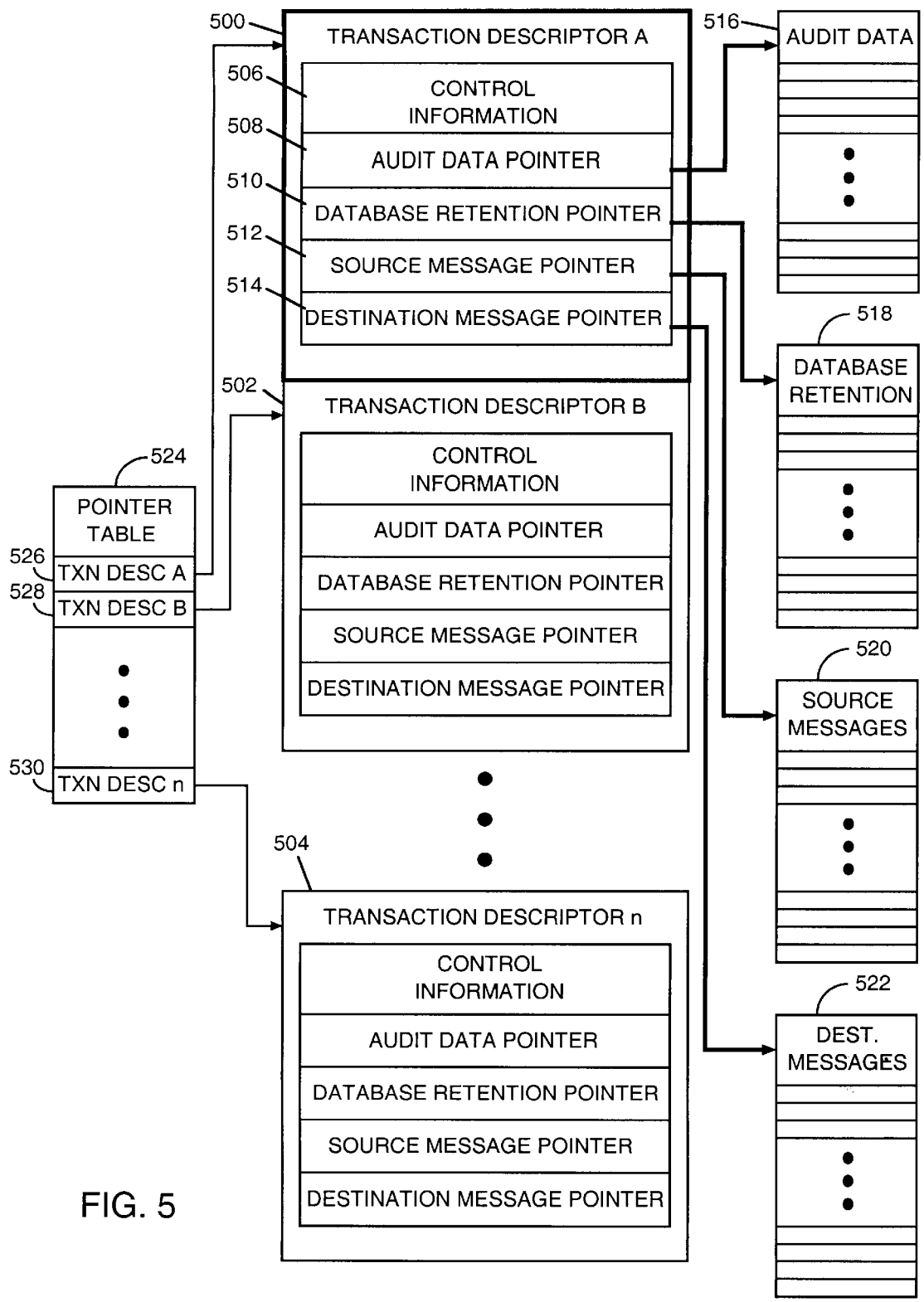
FIG. 5 illustrates a linked-list structure comprising multiple transaction descriptors.

FIG. 5 illustrates a linked-list structure comprising multiple transaction descriptors. The transaction descriptors are data structures which manage changes to the database, audit trail or other data retention structures on a per-transaction basis. A number of these transaction descriptors can be predefined, and any additional transaction descriptors required can be created by the I/O task management system when needed.

Each of the transaction programs in the computer system is associated with a transaction descriptor, which, in one embodiment of the invention, is created by scheduling its corresponding transaction program. The transaction descriptors illustrated in FIG. 5 include transaction descriptor A 500, transaction descriptor B 502, through transaction descriptor n 504. In one embodiment of the invention, each transaction descriptor includes a plurality of memory fields. For example, transaction descriptor A 500 includes a control information field 506, and audit data pointer field 508, a database retention pointer field 510, a source message pointer 512, and a destination message pointer 514. Transaction descriptors B 502 through transaction descriptor n 504 include analogous memory fields.

The control information field 506 includes control information, such as information that identifies which particular transaction that transaction descriptor is associated with. The control information also identifies which of the host processors initiated the database transaction. This allows information associated with a transaction to be quickly located.

To protect against loss of data in the event of a catastrophic disk failure, each database update is ultimately saved to the audit trail. In one embodiment of the invention, each host includes an audit trail. The audit trail information can be applied to an older version of the database to recreate the latest copy of the database if that copy of the database is lost as a result of the failure. Audit data corresponding to the pending database update is stored during the database update, and is provided to an audit data queue to be applied to the audit trail when the transaction is committed or rolled back. Further, when a database transaction has not yet reached a state where the corresponding database updates can be permanently applied to the database, the transaction has not yet been committed. If a failure occurs before updates are committed, the updates must not be applied to the database in order to maintain data consistency. The use of database retention data, described more fully below, prohibits database updates from occurring in these instances.

The audit data pointer field 508 includes an identifier that designates the location of audit data. The identifier may be in the form of an address, pointer, or other link that identifies the audit data bank 516 location of the audit data. The audit data includes the currently pending data updates and messages, which is temporarily stored until it can be queued to the audit trail when the transaction is committed or rolled back.

Transaction descriptors make the creation of the audit trail more efficient. Because the transaction descriptors are stored in a non-volatile storage medium, the audit data need not be written immediately to the audit trail at transaction commit/rollback to protect the data. Instead, the audit data can be queued within the non-volatile memory. This increases system throughput, as a host can begin a new transaction without waiting for the audit trail data to be recorded. Additionally, the use of transaction descriptors minimizes the amount of data that must be written to the audit trail, because the transaction identifier need only be recorded once for the data included in the transaction descriptor, and need not be repeated for every update associated with the transaction.

The database retention pointer field 510 includes an identifier that designates the location of database retention data. In one embodiment of the invention, the memory 330 includes a cache memory which, as is known to those skilled in the art, operates on the principle that certain memory locations will soon be accessed based on a current accessed memory location, or that certain memory locations tend to be accessed more often. A transaction initiated by a user may attempt to modify one or more predefined segments of the database that are stored in the cache memory. In one embodiment, these predefined portions are referred to as "pages", and include a number of 28-word blocks. Those blocks already existing at locations within the cache that are targeted for modification by the transaction are temporarily stored in a database retention memory structure 518. Whether a block will be modified or not can be determined by comparing the transaction page to the corresponding page stored in the cache. The blocks of retention data which are to be modified are temporarily stored in the database retention memory structure 518 in order to save the most recently known valid state of these blocks of data which are targeted as a result of the transaction. The retention file data is stored in the database retention memory structure 518 before the cache copy of the data is modified, and the cache copy of the data is then updated to reflect the database modifications resulting from the transaction upon being "committed". The retention file data can then be used to vacate the changes and restore the database to its prior valid state in the event that a failure occurs which prevents the new data from being committed.

The source message pointer field 512 includes an identifier that designates the location of source messages received by way of scheduling a particular transaction program by step control. Therefore, when a source message is sent via a host processor to the I/O task management system 216, the source message itself is stored in the source message data structure 520, and a pointer or link identifying the location of the message data is stored in the source message pointer field 512 as part of the transaction descriptor A 500 when the transaction program which is providing the transaction has been scheduled. More particularly, the pointer is stored first in the input message queue 406 of FIG. 4, and when the transaction is scheduled, the transaction descriptor A 500 is allocated (or created if necessary) and the source message pointer is moved to the source message pointer field 512.

The destination message pointer field 514 includes an identifier that designates the location of destination messages that are to be returned to a user terminal by way of a particular transaction program. Destination messages are used to return status or provide an acknowledgment that a request has been handled accordingly. The destination messages are stored in the destination message data structure 522, and a pointer to the associated destination message is stored in the destination message pointer field 514.

All information associated with a particular transaction is therefore organized via the transaction descriptor 500. In other words, each transaction is organized on a per-transaction basis, which simplifies recovery operations. Furthermore, transaction information can be stored in the centralized, non-volatile memory rather than requiring external storage banks for each component (e.g., database management systems and the like). The transaction descriptors also expedite recovery processing in a multi-host system by allowing operable host processors to perform recovery operations, which is possible because the transaction descriptors are linked in a common non-volatile memory accessible by all host processors. Therefore, one or more non-failing hosts can access the transaction descriptors for the failing host. A designated recovery host may read the failing host's transaction descriptors and perform a commit or rollback according to the information included therein.

The linked-list structure of transaction descriptors 500, 502, 504 depicted in FIG. 5 are arranged according to the contents of a pointer table 524 in one embodiment of the invention. In this embodiment, the pointer table 524 stores pointers 526, 528 through 530 to the address of each of the transaction descriptors A 500, B 502 through transaction descriptor n 504 respectively, so that desired transaction descriptors can be quickly and easily located.

Each executing transaction program can terminate under one of two conditions, "commit" or "rollback". If the transaction proceeds to a stable point where it can be committed, all new updated data is secured to the database by the database management systems. Therefore, all of the transaction's previously requested database changes and destination messages are made permanent in an indivisible and recoverable manner. If the transaction does not proceed to a stable point because a failure occurs before this committed state can be achieved, none of the updates are applied, but rather are "rolled back" so that the previous copy of the data is maintained.

Figure 6:
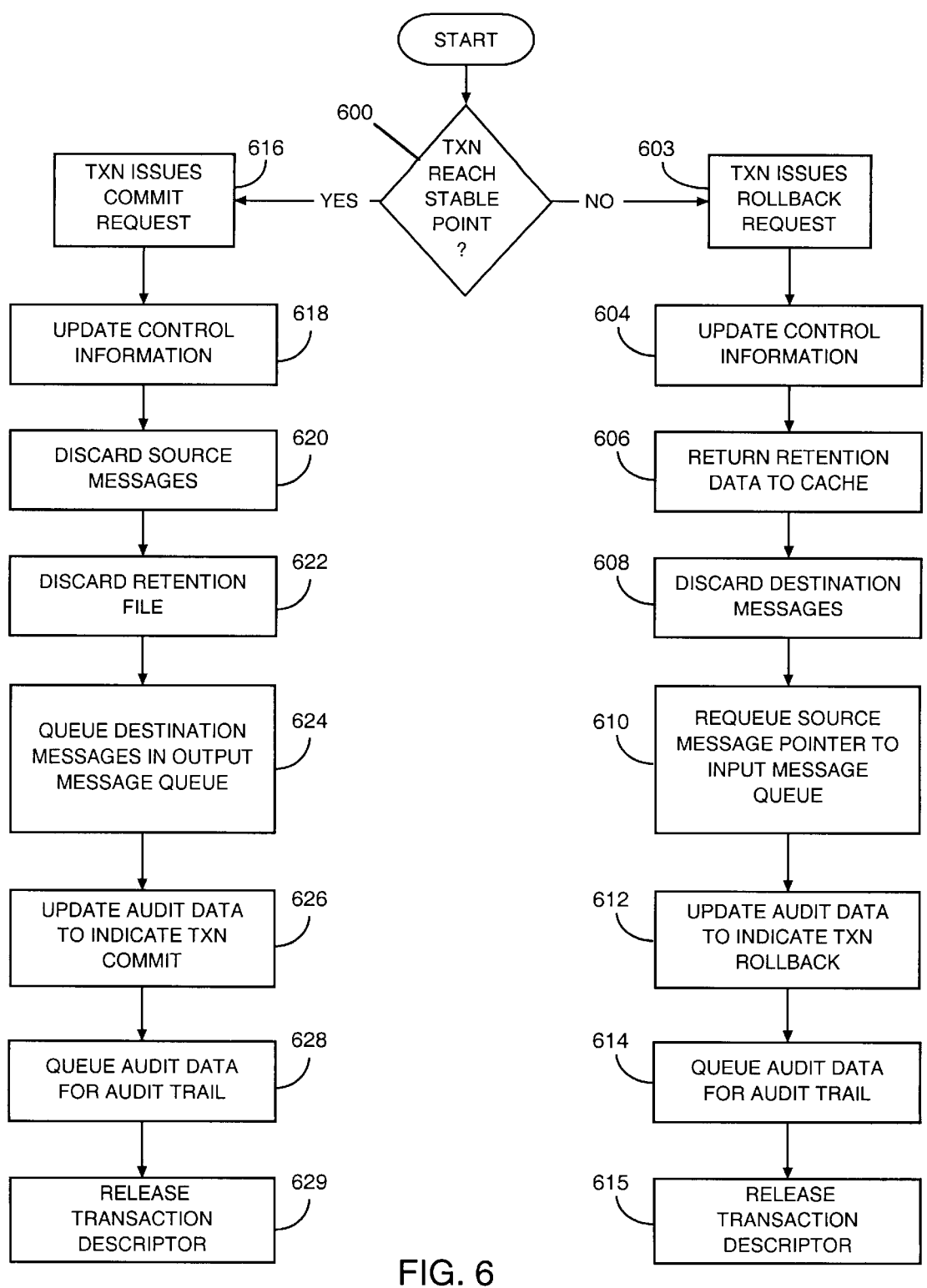
FIG. 6 is a flow diagram illustrating one manner in which the audit data is classified according to the state of the transaction.

FIG. 6 is a flow diagram illustrating one manner in which the audit data is classified according to the state of the transaction. The state of the transaction may be "active", which indicates that the transaction program is currently in execution. In this state, audit data records are stored until the transaction is terminated. The transaction enters a "terminated" state upon completion of all of the database updates and storing of audit data records. The terminated state includes the "commit" and "rollback" states, and FIG. 6 illustrates one embodiment of transaction commit and rollback processing, and its relationship to transaction states during auditing. The transaction program itself determines when a stable point has been reached, as shown at step 600. A "stable" point is the point at which the database updates can be committed. The logic in the transaction must be specific to the nature of the application database that it is processing against. For example, in a banking application, records in an individual's account and an inter-bank account might have to be updated to reflect a transfer of funds. Similarly, a query request to change all employees with zip code of 11111 to zip code 22222 might result in several hundred database change requests before a commit. If a stable point has not been reached, a database rollback will be required.

At any point in time during the life of a transaction program, the transaction descriptors contain all of the information necessary to recover a particular transaction. A transaction descriptor is marked as "active" when the transaction descriptor is allocated/created. In the event that a transaction does not reach a stable point, the transaction issues a rollback request 603. The control information is updated 604 to reflect the transaction state as being rollback. If a host or component failure occurs, this state (e.g., either rollback or active) indicates to a recovery module that the transaction must be rolled back, since the data has not been committed. The retention data temporarily stored in the database retention memory structure 518 (FIG. 5) is copied back to the memory cache to negate the transaction update requests, as indicated at step 606. The destination messages may be discarded 608 (or alternatively subsequently overwritten), and the source messages are requeued 610 for subsequent rescheduling of the transaction program by moving the source message pointer in the source message pointer field 512 (FIG. 5) back into the input message queue 406 (FIG. 4). The audit data is updated 612 to indicate a transaction rollback event, and the audit data is queued 614 for subsequent writing to the audit trail by moving the audit data pointer in the audit data pointer field 508 (FIG. 5) to a queue designed to sequentially store the audit data in the audit trail. The transaction descriptor is then released 615 for use by other transactions.

In the event that the transaction does reach a stable point, the transaction issues a commit request 616, and the control information is updated 618 to reflect the transaction state as being "commit". The source messages, and the retention data temporarily stored in the database retention memory structure 518 (FIG. 5), are discarded or overwritten during a subsequent transaction, as shown at steps 620 and 622. The destination messages are queued 624 for subsequent transmission to the user terminal by moving the destination message pointer in the destination message pointer field 514 (FIG. 5) into the output message queue 421 (FIG. 4). The audit data is updated 626 to indicate a transaction commit event, and the audit data is queued 628 for subsequent writing to the audit trail by moving the audit data pointer in the audit data pointer field 508 (FIG. 5) to the queue designed to sequentially store the audit data in the audit trail. The transaction descriptor is then released 629 for use by other transactions.

Where no host or components fail, transactions will be scheduled. Each transaction retrieves its source message and attempts to update one or more database records. If the transaction successfully updates the targeted records, i.e., reaches a stable point, then steps 616–629 occur. However, the transaction may be unsuccessful in updating the targeted records. For example, a record may not have been able to be read, or an error in the transaction program itself may prevent successful database updates. In this case, steps 603–615 occur. In the case of a transaction error which causes the transaction to abort, the system components (such as step control) issue a rollback request on behalf of the transaction at step 603.

In the case of a host or component failure, the control information from each transaction descriptor for the failing host or component is retrieved by the system recovery software operating under the control of a recovery mechanism (such as a non-failing host processor, or dedicated recovery processor). If the control information indicates "commit", steps 620–629 occur; otherwise, steps 606–615 occur.

Figure 7:
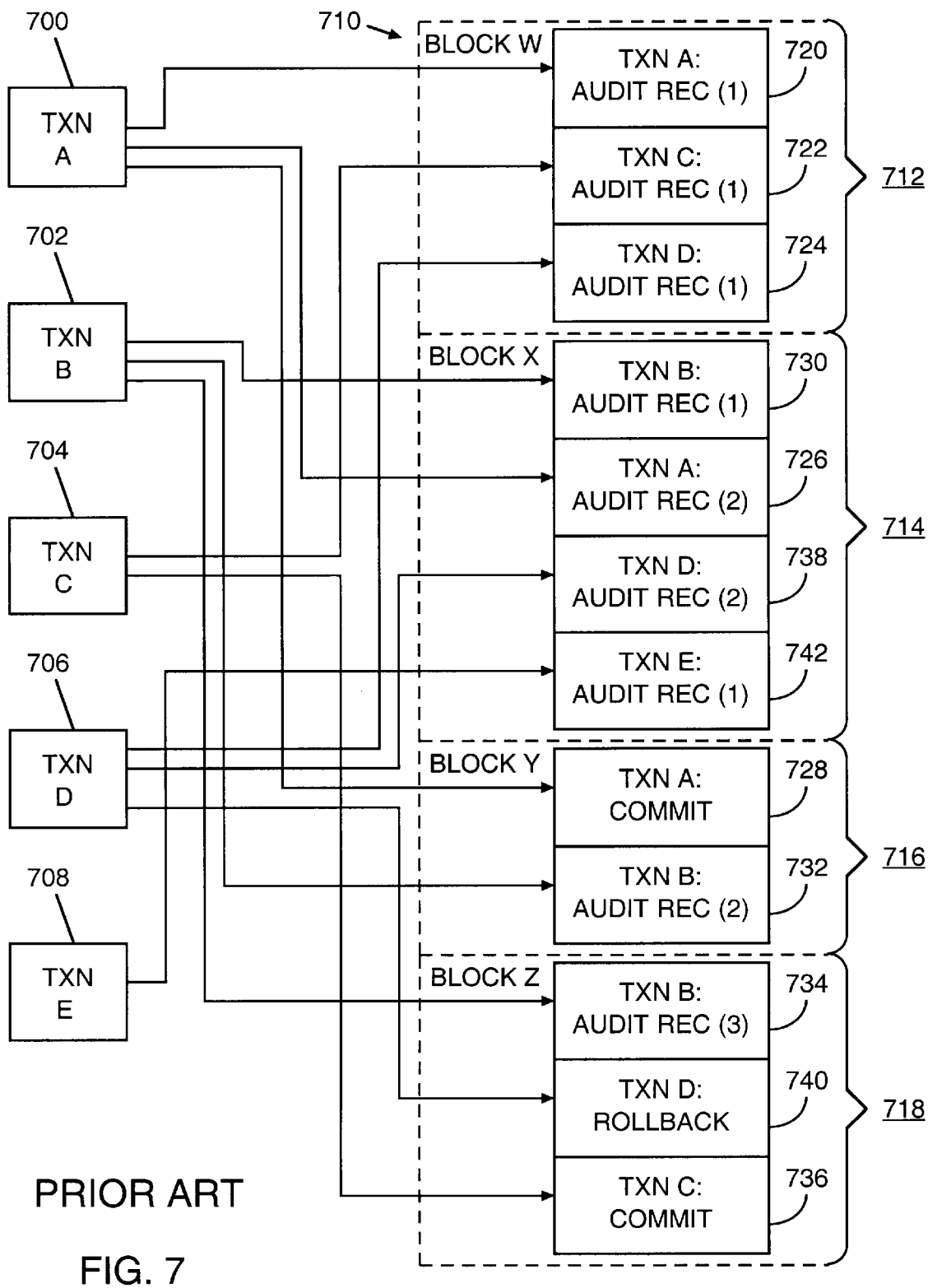
FIG. 7 is a block diagram illustrating a prior art recovery system in which recovery data is sequentially accumulated in a piece by piece fashion over the life of a transaction program.

FIG. 7 is a block diagram illustrating the manner in which audit data is sequentially accumulated over the life of a transaction program in the prior art recovery system. In FIG. 7, five separate transaction programs are represented by transaction A 700, transaction B 702, transaction C 704, transaction D 706, and transaction E 708. Each of the transaction programs provides audit data to the external audit trail 710 as it becomes available at the transaction programs. For I/O efficiency, synchronous audit requests are delayed slightly so that audit data from many transactions in execution can be grouped into each audit block and written to the audit trail as one I/O transfer. These blocks are illustrated as block W 712, block X 714, block Y 716, and block Z 718. Therefore, audit data or state information from transactions A, C, and D (700, 704, and 706) are concurrently transferred to audit trail positions 720, 722, and 724 of block W 712.

Audit trail segment 720 on the external audit trail 710 represents a first audit record supplied by transaction A 700. Similarly, audit trail segments 722 and 724 represent the first audit records provided by transactions C 704 and D 706, respectively. Although the data is successfully stored to the external audit trail 710, it is done so in a piecemeal fashion. This is further evidenced by audit trail segment 726 of block X 714 which is the second audit record provided by transaction A 700. Transaction A is committed at audit trail segment 728, thereby making the database changes permanent. As can be seen, the audit data records and state information are not grouped according to transaction, but rather in the order in which the transaction, audit data records, and state information becomes available. As will be described in more detail below, this poses a problem for the recovery system, from the standpoint of complexity and efficiency.

Each of the remaining active transaction programs which are performing transactions B 702, C 704, D 706, and E 708 also transfer audit data records and state information to the external audit trail 710. Transaction B 702 transfers a first audit record to audit trail segment 730 of block X 714, a second audit record to audit trail segment 732 of block Y 716, and a third audit record to audit trail segment 734 of block Z 718. Transaction C 704, whose first audit record was stored at audit trail segment 722, provides state information at audit trail segment 736 that the data has been committed. Transaction D 706 provides first and second audit records at audit trail segments 724 and 738, respectively, and provides state information at audit trail segment 740 to indicate a rollback condition. Finally, transaction E 708 is shown as providing an audit record to the external audit trail 710 at audit trail segment 742. As can be seen the transaction audit records and state information from each of the transaction programs are scattered throughout the external audit trail 710. Actual application environments may include hundreds of transactions which are executed every second, which would obviously further complicate recovery of any particular transaction from the external audit trail 710.

Figure 8:
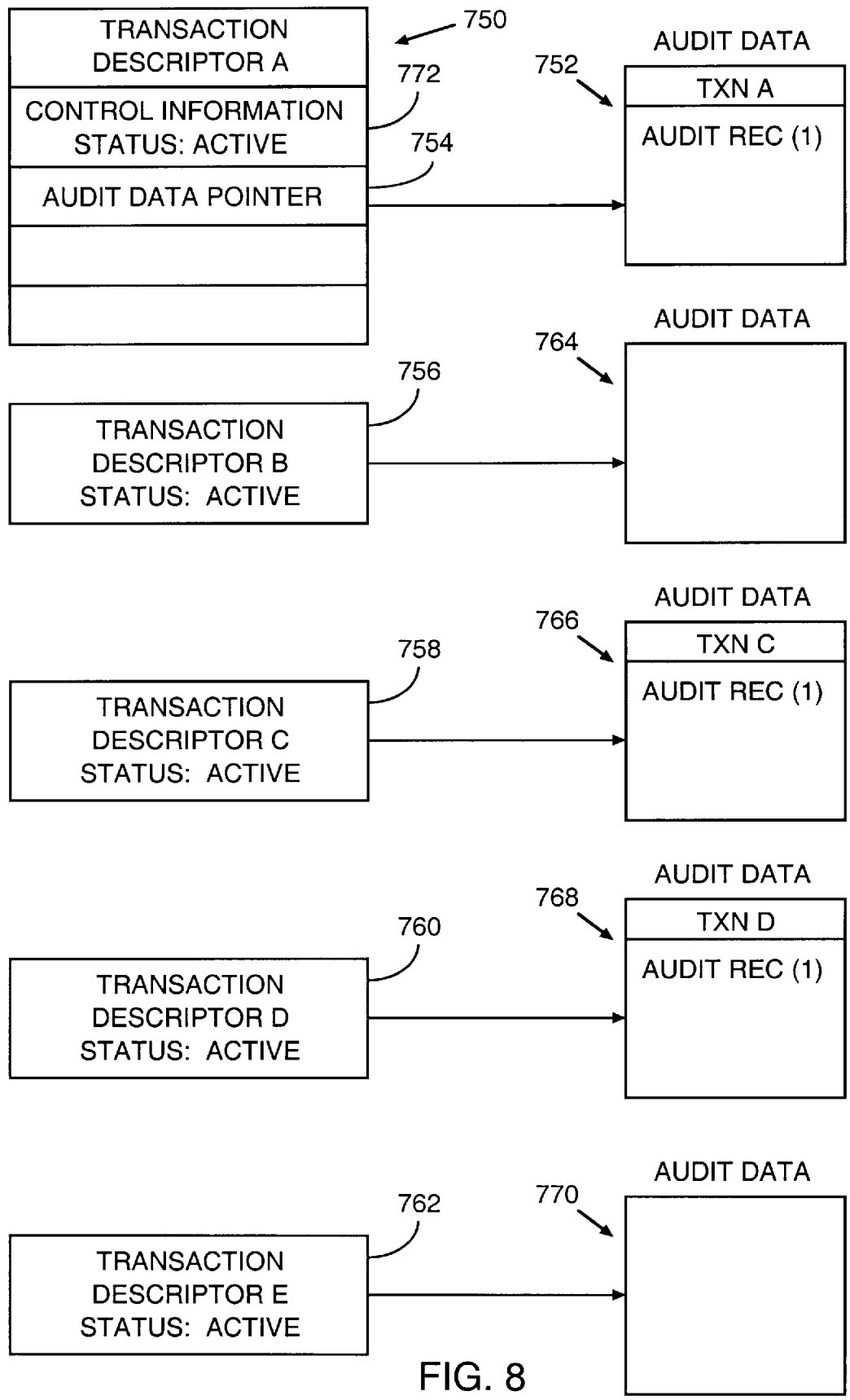
FIG. 8 is a diagram illustrating the segregation of restoration data using transaction descriptors in accordance with the present invention.

Referring now to FIG. 8, a diagram illustrating the segregation of audit data using transaction descriptors in accordance with the present invention is provided. While transaction programs are in execution, audits for their database changes and destination messages are accumulated in their respective data banks associated with their transaction descriptor. Since each transaction descriptor is independently accessible, interaction of transaction audits is avoided. For example, a system executing five transactions, such as transactions 700–708 in FIG. 7, stores respective audit data records and state information in individual audit data banks associated with each transaction. A transaction descriptor A 750 has an associated audit data bank 752 to store audit records and state information. The audit data pointer 754 provides an address to its corresponding audit data bank 752. Transaction descriptors B 756, C 758, D 760, and E 762 are also provided for each of the remaining transaction programs in execution, and have corresponding audit data banks 764, 766, 768, and 770, respectively.

Each of the transaction descriptors shown in FIG. 8 currently indicates an "active" status in the control information field, as illustrated in the control information field 772 of transaction descriptor A 750. When an audit record becomes available as a result of a requested database update, it is stored in its corresponding audit data bank. In this example, a first audit data record is generated by transactions A, C, and D, and are stored in audit data banks 752, 766, and 768, respectively. These records correspond to the records that were stored on the external audit trail 710 of the prior art system shown in FIG. 7 at audit trail segments 720, 722, and 724. Subsequent audit data records and state information for each transaction program are segregated such that each audit data bank stores only those audit records and state information that correspond to its corresponding transaction, as will be described more fully in connection with FIG. 9.

Figure 9:
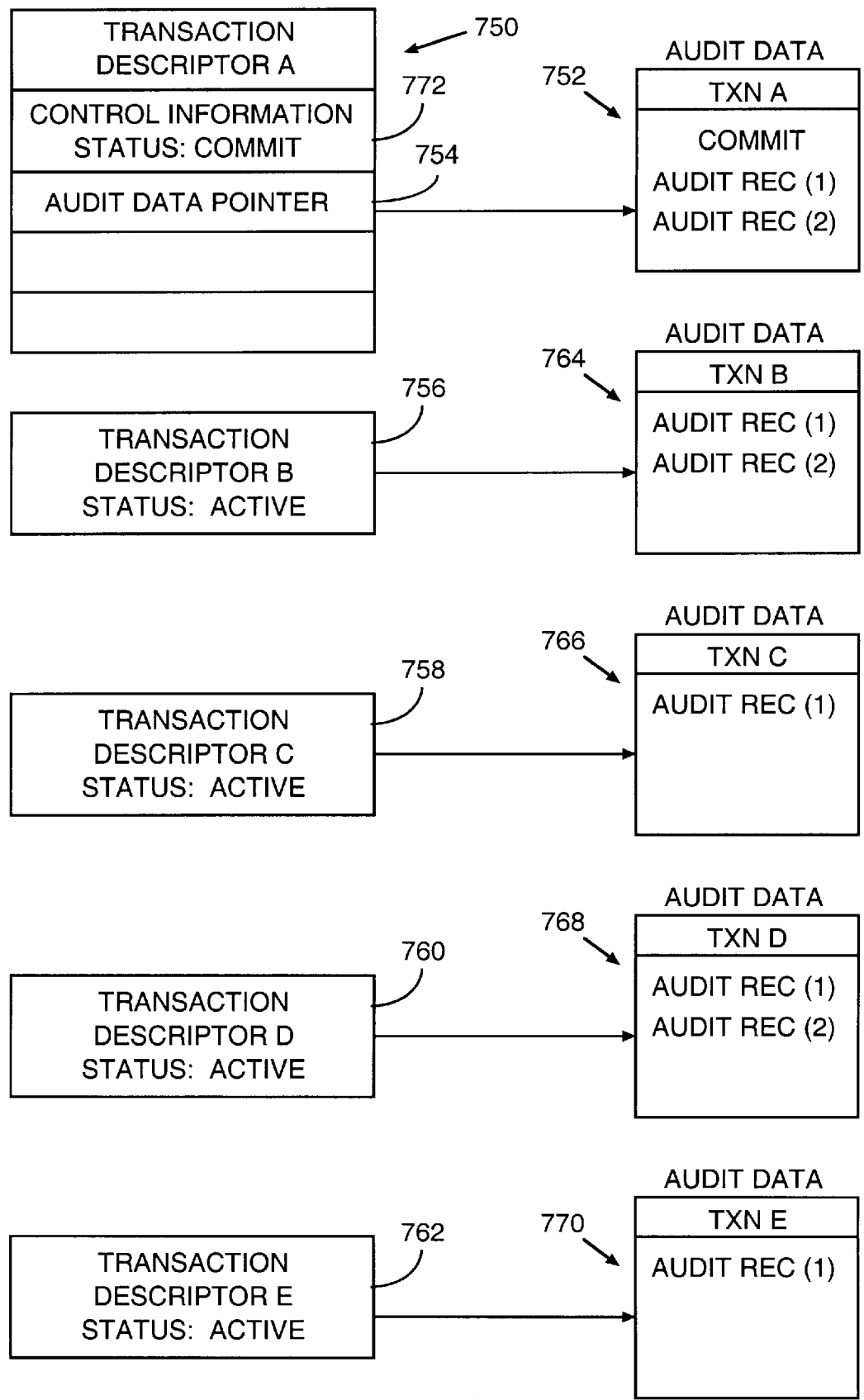
FIG. 9 is a diagram illustrating the progression of restoration data segregation on a per-transaction basis using transaction descriptors in accordance with the present invention.

FIG. 9 is a diagram illustrating the progression of audit data segregation on a per-transaction basis using transaction descriptors in accordance with the present invention. The audit data records and state information in the audit data banks of FIG. 9 correspond to the audit data records and state information which were placed on the external audit trail 710 of the prior art system of FIG. 7 as was shown in block W 712, block X 714, and block Y 716. The audit records and state information are continually segregated in each transaction program's audit data bank. The first two audit data records in audit trail segments 720 and 726 of FIG. 7, along with the commit state information in audit trail segment 728, are conveniently stored in the audit data bank 752 in the system of the present invention as shown in FIG. 9. Similarly, two new audit records associated with transaction descriptor B 756 are stored in audit data bank 764, a second audit record (AUDIT REC 2) associated with transaction descriptor D 760 is added to audit data bank 768, and a first audit record (AUDIT REC 1) associated with transaction descriptor E 762 is added to audit data bank 770. Audit data banks that include state information such as a commit or rollback indication (e.g., audit data bank 752) can subsequently be queued for external auditing, as will be described more fully in connection with FIG. 10.

Figure 10:
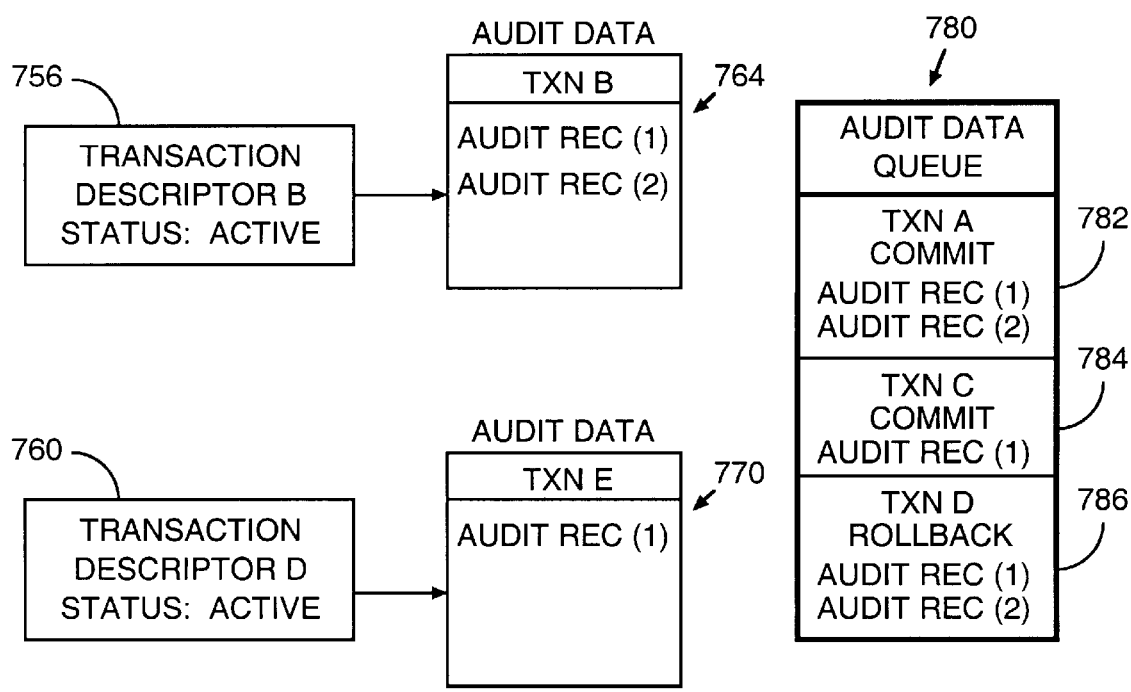
FIG. 10 illustrates how segregated transaction information is queued for external auditing of terminated transactions.

FIG. 10 illustrates how segregated transaction information is queued for external auditing of terminated transactions. The transaction programs using transaction descriptor B 756 and transaction descriptor D 760 are still active as represented by the status in their respective control information fields. Therefore, no termination indication, such as a commit or rollback indication, has yet been identified for transactions B and D. The audit data banks 764 and 770 reflect the audit records associated with each of the transaction descriptors B 756 and D 760. However, the audit data records associated with transactions A, C, and D have been moved to the audit data queue 780. Information is transferred from the audit data banks to the audit data queue 780 when the status at the transaction descriptor changes from active to a transaction terminated status, i.e., commit or rollback. In one embodiment of the invention, the audit data queue 780 is part of the memory 330 in the I/O task management system 308 of FIG. 3, which is a non-volatile memory. The purpose for storing the audit records on the non-volatile audit data queue 780 will be described in the description corresponding to FIG. 12. Alternatively, the audit data records, which have been divided among multiple audit data banks on a per-transaction basis, could be stored directly on a tape or disk external to the I/O task management system 308.

The audit data queue 780 of FIG. 10 includes three audit trail records, labeled TXN A 782, TXN C 784, and TXN D 786. The audit trail record 782 includes all related audit data records, labeled AUDIT REC (1) and AUDIT REC (2), as well as the state information which, in the case of transaction A, is a commit indication. Audit trail record 782 therefore provides all information needed to recover transaction A in the event of a disk failure, and the recovery system does not need to search the entire audit trail to pull together all of the audit data records and state information corresponding to a particular transaction. The present invention provides this information in the audit data queue 780 on a per-transaction basis. Providing this information in this manner significantly reduces system overhead, and increases speed and efficiency of the transaction processing system.

The audit trail records 782, 784 and 786 are placed on the audit data queue 780 in the chronological order that their respective transactions were terminated. Within each audit trail record, the particular audit data records are contiguous because the audit trail records are separated on a per-transaction basis. Therefore, the transaction identifier (e.g., TXN A in audit trail record 782) need be provided to the external audit trail only once rather than for each individual record as was required by the prior art systems. Because some transactions may make several hundred or more database updates, the elimination of providing redundant transaction identifiers in this manner can considerably reduce the time required to store the information on the external audit trail.

Figure 11:
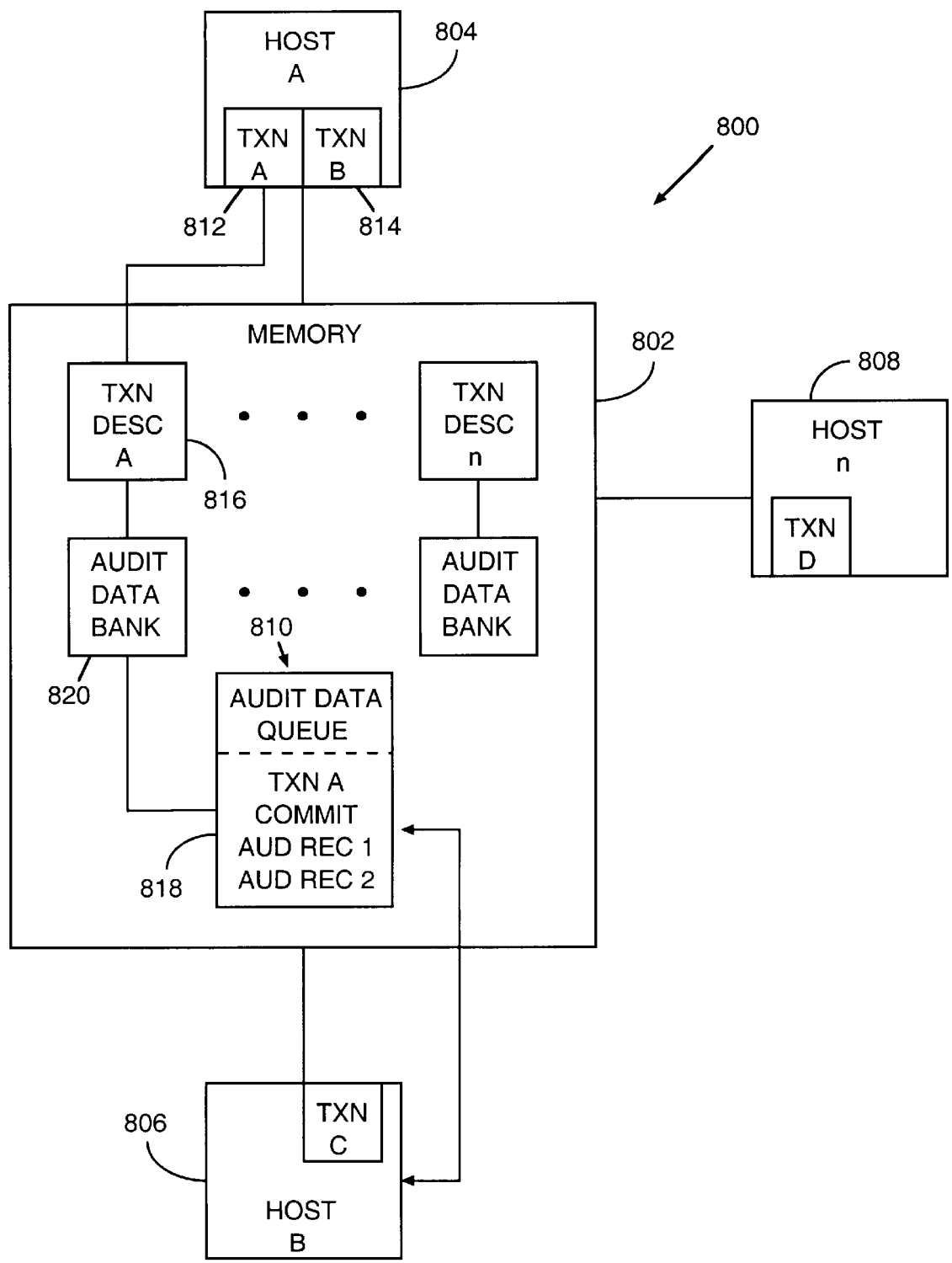
FIG. 11 is a block diagram of a multiple-processor transaction processing system capable of performing recovery actions for a failed processor.

FIG. 11 is a block diagram of a multiple-processor transaction processing system 800 capable of performing recovery actions for a failed processor. The memory 802 corresponds to memory 328 of the I/O task management system 308 of FIG. 3. This is a centralized, common memory accessible by all of the host processor A 804, host processor B 806 through host processor n 808 in the system 800. In one embodiment of the invention the audit data queue 810, analogous to the audit data queue 780 shown in FIG. 10, is a portion of the memory 802. Therefore, the audit trail is stored in non-volatile memory, rather than, or in addition to, on an external tape or disk. This also allows each of the host processors 804, 806, 808 to access the audit data queue 810, so that recovery from a failed disk can be accomplished via an operable processor.

For example, where host A 804 executes transactions A 812 and B 814 and host processor A 804 experiences a failure after termination of transaction A 812, another host can recover the database by accessing the audit data queue 810. Rather than reading an external audit trail, the host recovery system can read the transaction descriptor 816 and access the queued information 818 provided by the audit data bank 820 to resolve the transactions that were in execution. This can be accomplished because the transaction descriptors each include the status indications of active, commit, or rollback, and the recovery processor can access the transaction descriptors that were utilized by the failed processor. Furthermore, using the configuration of FIG. 11, host recovery does not need to access the external audit trail where the memory 802 is still operational, although an external audit trail is still generated in the event that it is needed for more catastrophic failures. The audit data queue 810 has a faster access time than tape and mass storage media, and can be randomly accessed whereas tape media is chronologically accessed.

Figure 12:
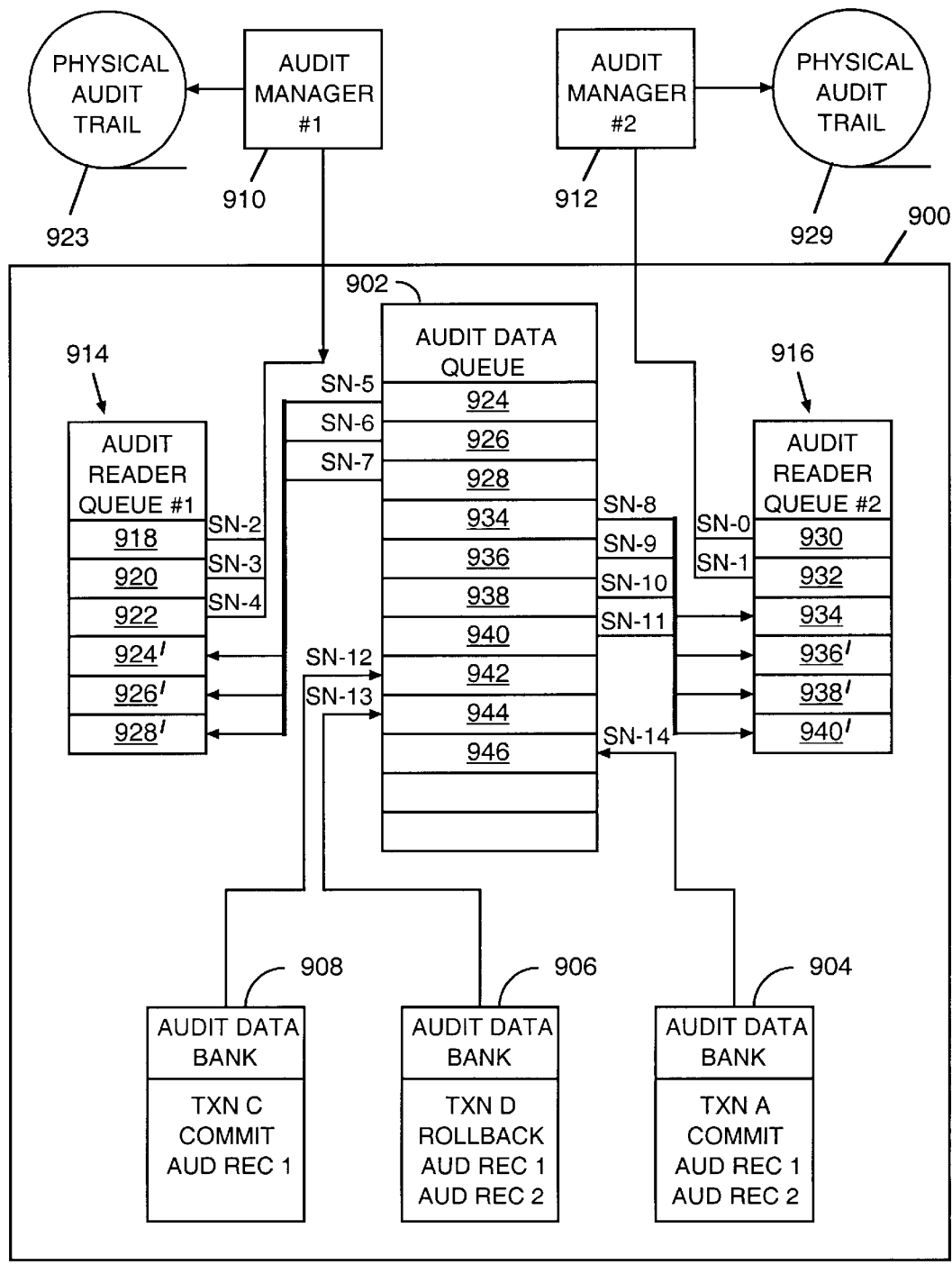
FIG. 12 is a block diagram illustrating one aspect of the invention where restoration data is transferred to multiple physical storage units while maintaining chronological ordering and recoverability of the restoration data.

FIG. 12 is a block diagram illustrating one aspect of the present invention where audit data is transferred to multiple physical audit storage units (i.e., "audit trails") while maintaining chronological ordering and recoverability of the audit data. It is desirable to include physical audit trail storage media, such as tapes or disks, to provide a means for recovery in the event of a catastrophic event which affects the database storage media. The audit data that is generated and stored in the audit data queue (e.g., audit data queue 780 of FIG. 10) should be transferred to a physical audit trail such that the chronological order of the terminated transactions is preserved, and such that the audit data is recoverable in the sense that is cannot be discarded from the memory until it has been successfully secured on the physical audit trail via an audit interface module such as an audit manager program. Further, because transactions may be executing on more than one host for a multi-host application, multiple instances of the audit manager program should be permitted to run in order to accommodate the volume of audit data being created.

In prior art systems, audit data created by transactions which are processed under the control of a given host are chronologically secured to the physical audit trail by a single instance of audit interface software running on that host processor. This typically results in the audit interface program being a limitation to the on-line transaction throughput which can be realized on a host. One aspect of the present invention provides memory audit queue and audit reader queue structures which allow the transaction audit data to be transferred to one or more instances of the audit interface program while maintaining chronological ordering and recoverability of the audit data.

Referring now to FIG. 12, the memory 900 within the I/O task management system includes audit data queue 902, which is analogous to the audit data queue 780 shown in FIG. 10. The audit data queue 902 serves as a first-in-first-out (FIFO) queue for the newly arriving audit data from the audit data banks 904, 906, 908. Each audit data entry on the audit data queue 902 is assigned a unique sequence number to preserve the chronological ordering of the terminating transactions.

Each instance of the audit interface program, labeled audit manager #1 910 and audit manager #2 912 in the present example, have corresponding audit reader queues 914 and 916 respectively to reflect which audit data banks they are currently auditing. Each audit manager 910, 912 instance issues a release/retrieve command to release previously retrieved audit data which has been successfully audited and placed on its respective audit reader queue 914, 916, and further retrieves new audit data from the audit data queue 902 to be placed on the corresponding audit reader queue 914, 916. For example, audit manager #1 910 issues a release/retrieve command which releases audit data entries 918, 920 and 922 having sequence numbers SN-2, SN-3 and SN-4 respectively to the physical audit trail 923, and retrieves new audit data entries 924, 926 and 928 having sequence numbers SN-5, SN-6 and SN-7 from the audit data queue 902 to create entries 924', 926' and 928' on the audit reader queue 914. Similarly, audit manager #2 912 issues a release/retrieve command which releases audit data entries 930 and 932 having sequence numbers SN-0 and SN-1 respectively to the physical audit trail 929, and retrieves new audit data entries 934, 936, 938 and 940 having sequence numbers SN-8, SN-9, SN-10 and SN-11 from the audit data queue 902 to create entries 934', 936', 938' and 940' on the audit reader queue 916. New audit data from audit data banks 904, 906 and 908 is queued in the audit data queue 902 in chronological order, i.e., according to the assigned sequence numbers. Therefore, the audit data of audit data bank 908 creates entry 942 having sequence number SN-12, the audit data of audit data bank 906 creates entry 944 having sequence number SN-13, and the audit data of audit data bank 904 creates entry 946 having sequence number SN-14. The determination of whether audit reader queue 914 or audit reader queue 916 receives the next available entry from the audit data queue 902 is based on available space in each audit reader queue. The data can therefore be stored in either of the physical audit trails.

The audit data queue 902 resides in the memory along with the transaction descriptors and their corresponding audit data banks. Transaction termination does not need to be unduly delayed while its audit data is secured to the physical audit trail, which thereby increases transaction throughput, because the transaction's audit data is simply requeued from the transaction descriptor's target audit data bank to the audit data queue 902 within the same memory. Enough instances of the audit managers 910, 912 are made available to keep up with incoming transaction descriptor audit data. The invention allows for instances of audit managers to be dynamically started/stopped depending on the activity of the on-line transaction programs.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for collating database recovery information on a storage media in a transaction processing system capable of concurrently executing multiple transactions, wherein the database recovery information includes previously valid database records which are used to restore a database to a previously valid condition upon recognition of one or more transaction errors; the method comprising:

chronologically storing database records generated by active transactions in storage banks partitioned according to transaction;

queuing the database records from the storage banks associated with completed database transactions in the order that the active transactions were completed; and transferring the queued database records to the storage media, whereby the queued database records are grouped according to transaction in the order that the active transactions were completed.

2. The method as in claim 1, wherein chronologically storing database records comprises:

allocating a transaction-related database structure for each of the active transactions, wherein each of the transaction-related database structures includes a transaction identifier corresponding to a particular one of the active transactions;

storing a unique storage bank address in each of the transaction-related data structures identified by the transaction identifiers; and sequentially storing the database records associated with each of the active transactions in their respective ones of the storage banks using the transaction identifier and the unique storage bank address.

3. The method as in claim 2, wherein sequentially storing the database records comprises:

locating the transaction-related database structure corresponding to a new data record using the transaction identifier;

identifying the storage bank to receive the new data record using the unique storage bank address stored at the transaction-related database structure; and storing the new data record in the identified storage bank.

4. The method as in claim 3, wherein locating the transaction-related database structure comprises:

providing the transaction identifier with the new data record; and comparing the transaction identifier associated with the new data record to the transaction identifier associated with each of the transaction-related data structures.

5. The method as in claim 1, wherein chronologically storing database records comprises transferring the database records generated by each transaction into its corresponding one of the storage banks in an order in which the database records become available.

6. The method as in claim 1, further comprising partitioning a memory into a plurality of the storage banks identifiable by a transaction identifier provided with the database record.

7. The method as in claim 6, further comprising dynamically creating additional ones of the storage banks where a number of the active transactions exceeds a number of the partitioned storage banks.

8. The method as in claim 6, wherein the memory comprises non-volatile, random-access memory.

9. The method as in claim 1, wherein queuing in the order that the active transactions were completed comprises transferring all of the database records from one of the storage banks to a queue upon receipt of a completion notification from the corresponding active transaction.

10. The method as in claim 1, wherein the queue comprises a non-volatile memory queue.

11. The method as in claim 1, wherein transferring the queued database records to the storage media comprises transferring the queued database records to a magnetic, sequential-access storage media.

12. The method as in claim 1, further comprising storing the database records in the database for use by the transaction processing system.

13. A method for collating database recovery information on an external storage media on a per-transaction basis in a transaction processing system having one or more host processors and a database, wherein the database recovery information includes valid database records which are used to restore the database to a previously valid condition upon recognition of one or more database storage media errors; the method comprising:

(a) requesting execution of a plurality of database transactions from user terminals to one or more of the host processors;

(b) creating a transaction memory structure for each of the database transactions, wherein each of the transaction memory structures include a transaction identifier and a pointer to a unique storage bank designated for each of the database transactions;

(c) chronologically storing database records resulting from each of the database transactions in their respective ones of the storage banks;

(d) queuing the database records from the storage banks associated with completed database transactions in an order that the database transactions were completed; and (e) transferring the queued database records to the external storage media, whereby the queued database records are grouped according to transaction in the order that the database transactions were completed.

14. The method as in claim 13, further comprising accessing previously valid database records corresponding to the database transaction upon recognition of a transaction error, comprising:

identifying the transaction memory structure corresponding to the transaction error using the transaction identifier;

locating the unique storage bank identified by the pointer in the transaction memory structure; and restoring the database to a previously valid state by copying the previously valid database records from the unique storage bank to the database.

15. The method as in claim 14, wherein identifying the transaction memory structure comprises comparing a transaction error identifier to the transaction identifier in each of the transaction memory structures.

16. The method as in claim 13, wherein creating the transaction memory structure comprises:
   allocating a portion of a memory at the inception of the database transaction identified by the transaction identifier; and
   partitioning the portion of the memory into a plurality of fields, wherein each field stores one of the plurality of links to the distinct storage banks.

17. The method as in claim 13, wherein chronologically storing the database records comprises transferring the database records generated by each database transaction into its corresponding one of the distinct storage banks in an order in which the database records become available.

18. The method as in claim 13, wherein queuing the database records in the order that the database transactions were completed comprises transferring all of the database records from one of the distinct storage banks to a queue upon receipt of a completion notification from the corresponding database transaction.

19. The method as in claim 18, further comprising storing the completion notification in a control field of the transaction memory structure.

20. The method as in claim 18, wherein the completion notification is a data commit notification.

21. The method as in claim 18, wherein the completion notification is a data rollback notification.

22. The method as in claim 13, wherein transferring the queued database records to the external storage media comprises transferring the queued database records to a magnetic, sequential-access storage media.

23. The method as in claim 13, wherein the database transactions include database records corresponding to proposed data modifications to the database.

24. A memory architecture for allowing transaction recovery information to be arranged according to transaction, wherein the transaction recovery information includes previously valid database information used to restore the database to a valid state upon the occurrence of a transaction failure, the memory architecture comprising:
   (a) a plurality of storage modules, wherein each of the storage modules stores the transaction recovery information associated with a distinct one of the transactions; and
   (b) a plurality of memory structures each corresponding to a distinct one of the transactions to isolate accessibility of the transaction recovery information associated with the distinct one of the transactions to the corresponding memory structure, each memory structure comprising:
      (i) a control information field to store a transaction identifier that identifies the distinct transaction to which it corresponds; and
      (ii) at least one information address field to store a pointer to the storage module that stores the transaction recovery information associated with the transaction identifier;
   (c) a storage queue to collectively store each of the memory structures in an order in which each of the transactions is completed; and
   (d) a storage media to consecutively store the contents of the storage modules corresponding to the completed transactions by receiving contents of the queue in the order that each of the transactions is completed.

25. The memory architecture as in claim 24, wherein the storage media comprises a non-volatile memory queue.

26. The memory architecture as in claim 25, further comprising a magnetic sequential-access storage media coupled to the non-volatile memory queue to receive and permanently store the contents of the storage modules in an order in which the contents of the storage modules are queued.

27. The memory architecture as in claim 24, wherein the storage media comprises a non-volatile sequential-access storage media capable of retaining information upon loss of power to the memory architecture.

28. The memory architecture as in claim 24, wherein the storage media comprises magnetic tape.

29. The memory architecture as in claim 24, wherein the storage media comprises a magnetic disk.

30. The memory architecture as in claim 24, further comprising a recovery processor to restore the database to a valid state upon the occurrence of a transaction failure by copying the contents of the storage media onto the database at address locations which include data affected by the transaction failure.

* * * * *